(12) United States Patent
Matsushita et al.

(10) Patent No.: US 10,807,330 B2
(45) Date of Patent: Oct. 20, 2020

(54) METHOD OF PRODUCING OPTICAL CONNECTION COMPONENT

(71) Applicant: SUMITOMO ELECTRIC INDUSTRIES, LTD., Osaka-shi, Osaka (JP)

(72) Inventors: Naoki Matsushita, Osaka (JP); Tetsuya Nakanishi, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 192 days.

(21) Appl. No.: 16/007,196

(22) Filed: Jun. 13, 2018

(65) Prior Publication Data

US 2018/0361691 A1 Dec. 20, 2018

(30) Foreign Application Priority Data

Jun. 15, 2017 (JP) .................................. 2017-117359

(51) Int. Cl.
*B29D 11/00* (2006.01)
*G02B 6/02* (2006.01)
*B29K 709/08* (2006.01)

(52) U.S. Cl.
CPC ...... *B29D 11/0075* (2013.01); *G02B 6/02395* (2013.01); *B29K 2709/08* (2013.01)

(58) Field of Classification Search
CPC ............ B29D 11/0075; G02B 6/02395; B29K 2709/08
See application file for complete search history.

(56) References Cited

U.S. PATENT DOCUMENTS

2002/0094178 A1* 7/2002 Matsumoto .......... G02B 6/3636
385/115
2018/0136409 A1 5/2018 Mitose et al.

FOREIGN PATENT DOCUMENTS

WO WO-2017/026072 A1 2/2017

* cited by examiner

*Primary Examiner* — Mathieu D Vargot
(74) *Attorney, Agent, or Firm* — Faegre Drinker Biddle & Reath LLP

(57) ABSTRACT

A method of producing an optical connection component in which a surrounding of a plurality of bent glass fibers is integrally coated with resin. The method includes a step of preparing upper and lower molds for molding around a fiber array in which the plurality of glass fibers are arranged in a specified arrangement direction. The molds have two walls spaced apart from each other by a larger distance than the width of the fiber array. The method also includes a step of providing around the fiber array the molds such that each of the walls is disposed outside a corresponding one of two glass fibers that are included in the plurality of glass fibers and that are located at respective sides of the fiber array. The method also includes a step of supplying the resin into the molds.

6 Claims, 9 Drawing Sheets

METHOD OF PRODUCING OPTICAL CONNECTION COMPONENT

BACKGROUND OF THE INVENTION

Field of the Invention

The present invention relates to a method of producing an optical connection component in which exposed glass portions of bent optical fibers are coated with resin.

Description of the Related Art

An optical connection component that optically connects an electronic board to on-premises wiring or an external transmission path includes, for example, optical fibers, a fiber fixing component, and a connector. One end of each of the optical fibers is fixed to the electronic board by using the fiber fixing component, and the other end of the optical fiber is connected to the on-premises wiring or the like through the connector. With the tendency of reducing the sizes of optical modules mounted on the electronic board, reduction in height of optical connection component used near the optical modules is demanded. International Publication No. 2017/026072 discloses an optical connection component in order to address densely mounted optical modules. This optical connection component includes a plurality of optical fibers arranged parallel to one another (also referred to as "fiber array"), and each of the optical fibers has a bent portion. Hereafter, an optical fiber having a bent portion is referred to as "bent optical fiber".

The optical fibers included in the optical connection component described in International Publication No. 2017/026072 each have a first unbent portion, a bent portion, and a second unbent portion. The first unbent portion is held by a fiber fixing component, and the second unbent portion is connected to a connector. The bent portion is located between the first unbent portion and the second unbent portion and bent with its glass part exposed. International Publication No. 2017/026072 discloses a technique for protecting with potting resin the bent portion the strength of which is reduced due to removal of resin coating and bending.

SUMMARY OF THE INVENTION

An object of the present invention is to provide a method of producing an optical connection component that reliably protects with potting resin bent optical fibers even located at both sides of a plurality of arranged bent optical fibers.

The present invention relates to a method of producing an optical connection component. This optical connection component includes a fiber array and a resin layer covering the fiber array. The fiber array has a plurality of bent glass fibers arranged side by side and each of the bent glass fibers includes a core and a cladding that surrounds the core and that has a lower refractive index than a refractive index of the core. The method includes providing around the fiber array a mold that includes two walls spaced apart from each other by a larger distance than a width of the fiber array such that each of the two walls is disposed outside a corresponding one of two glass fibers that are included in the plurality of bent glass fibers and that are located at respective sides of the fiber array. The method also includes supplying resin into the mold, forming the resin layer by curing the resin, and removing the fiber array coated with the resin layer from the mold.

In the method according to the present invention, the mold may be separable and structured so as to cover both arrangement surfaces of the fiber array, and a curved recess may be provided in the mold so as to form the resin layer having a uniform thickness. Alternatively, the mold may have a U-shaped section that has the two walls and a bottom surface that connects the two walls to each other, and the mold may be provided around the fiber array such that one arrangement surface of the fiber array faces the bottom surface and another arrangement surface of the fiber array faces an opening of the mold. Alternatively, the mold may be provided around the fiber array such that one and another arrangement surfaces of the fiber array face openings of the mold.

In the method according to the present invention, the method may further including: preparing a plurality of optical fibers, each of the plurality of optical fibers including a glass fiber and a coating resin layer covering the glass fiber, the glass fiber including the core and the cladding; removing the coating resin layer from each of the plurality of optical fibers to expose the plurality of glass fibers; and heating and bending the plurality of glass fibers so as to provide the fiber array. Furthermore, a thickness of the resin layer may be from $50 \times 10^{-6}$ to $3000 \times 10^{-6}$ m.

With the method of producing an optical connection component according to the present invention, the resin layer is formed even between the endmost glass fibers and the walls of the mold. This allows the strength of the bent optical fibers to be improved. In particular, even when the strength of the optical fibers is reduced due to removal of the coating resin layer and heating of the exposed glass fibers in order to form the bent optical fibers, the resin layer having a specified thickness is formed so as to allow the strength of the bent optical fibers to be improved.

DESCRIPTION OF THE PREFERRED EMBODIMENTS

A preferred embodiments of a method of producing an optical connection component according to the present invention will be described below with reference to the accompanying drawings.

When resin is applied to a plurality of bent optical fibers that are arranged, this resin is concentrated to or around the bent optical fibers disposed at the center due to its own surface tension and unlikely to be concentrated to or around the bent optical fibers disposed at both sides. Accordingly, in order to protect bent portions with potting resin, a technique that facilitates coating of the resin over the bent optical fibers at both the sides is desired.

Figure 1A:
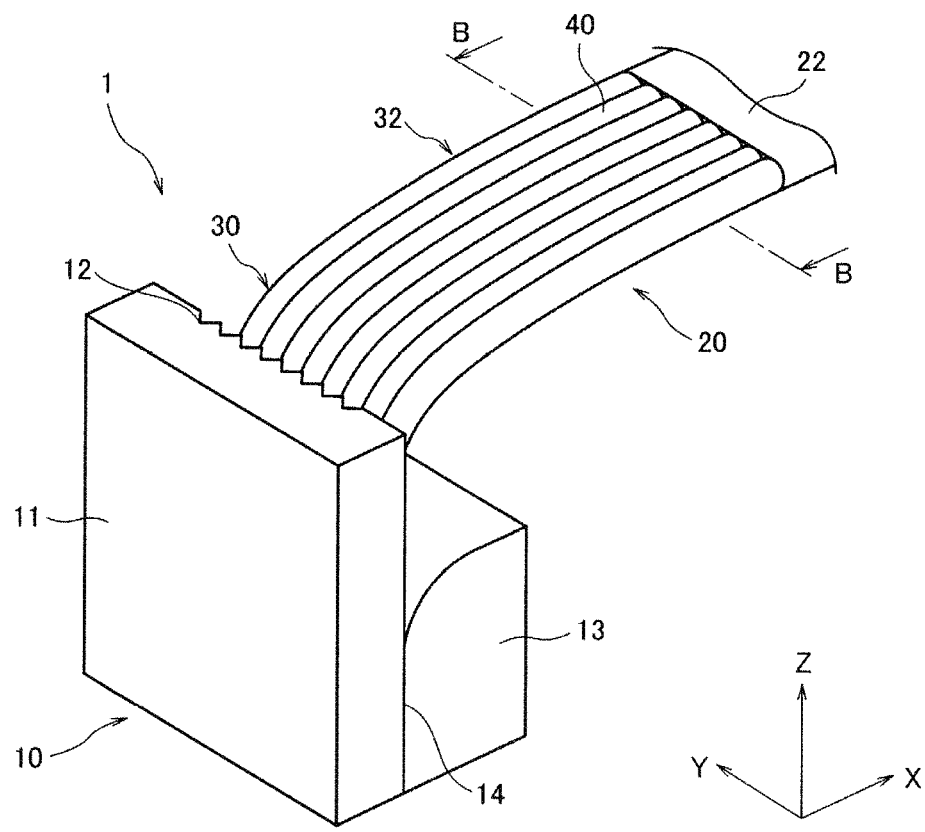
FIG. 1A is a perspective view of an optical connection component.

FIG. 1A is a perspective view of an optical connection component 1. The optical connection component 1 is used to optically connect, for example, an electronic board including an integrated optics chip and so forth to on-premises wiring or an external transmission path.

The optical connection component 1 includes, for example, eight bent optical fibers 20 arranged in the Y-axis direction illustrated in FIG. 1A. Each of the bent optical fibers 20 has a first unbent portion (not illustrated), a bent portion 30, and a second unbent portion 32. The first unbent portion is held by a fiber fixing component 10. The bent portion 30 is provided between the first unbent portion and the second unbent portion 32. The second unbent portion 32 is connected to, for example, a connector 48 illustrated in FIGS. 4A and 4B.

The fiber fixing component 10 includes a V-groove plate 11 and a rid 13. The V-groove plate 11 has V grooves 12 extending in the Z-axis direction illustrated in FIG. 1A. The V-groove plate 11 can support the first unbent portions of the bent optical fibers 20. The V-groove plate 11 is provided with eight V grooves 12 formed so as to be arranged in the Y-axis direction illustrated in FIG. 1A. The rid 13 has, for example, a flat plate shape and is in contact with the V-groove plate 11 at a holding surface 14. The bent optical fibers 20 are held between the V-groove plate 11 and the rid 13.

Thus, one end of each of the bent optical fibers 20 is held by the fiber fixing component 10 and to be fixed to the electronic board with a movement thereof in the X, Y, and Z-axis directions regulated. Meanwhile, the other end of the bent optical fiber 20 is to be connected to another optical fiber for on-premises wiring (or a single mode optical fiber (SMF) of an external transmission path) through the above-described connector 48.

Typically, an optical fiber includes a bare fiber 21 (FIG. 1B) and a collective coating layer 22 coated over a surrounding of the bare fiber 21. The bare fiber 21 includes a core and cladding that surrounds the core and has a lower refractive index than that of the core. However, the bent portion 30 of the bent optical fiber 20 of the optical connection component 1 is formed by removing the collective coating layer 22 and bending the exposed bare fiber 21 by heating. For this heating, a burner, a $CO_2$ laser, arc discharge, a heater, or the like is usable. Furthermore, the bare fiber 21 may be heated while being subjected to bending so as to reduce stress produced in the bent portion 30. The bare fiber 21 corresponds to a glass fiber of the present invention.

The bare fiber 21 is formed of silica-based glass and includes a core and cladding. Referring to FIG. 1A, the bare fiber 21 extends in the X-axis direction and is bent to a specified curvature (for example, 0.4 [1/mm] or more) so as to extend in the Z-axis direction. For example, eight bare fibers 21 are arranged in the Y-axis direction illustrated in FIG. 1A. Although a multimode optical fiber (MMF) is typically used as the bare fiber 21, a single mode optical fiber (SMF) may be used as the bare fiber 21.

Figure 1B:
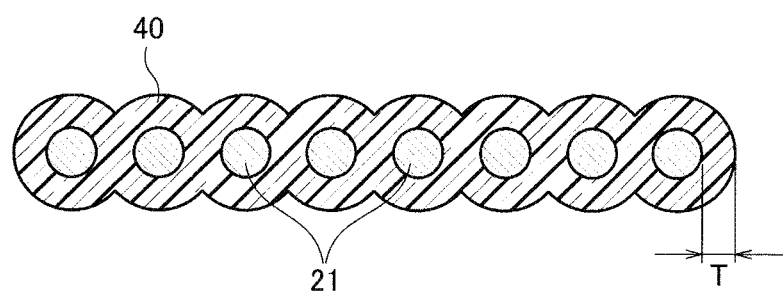
FIG. 1B is a sectional view seen in arrows B-B direction illustrated in FIG. 1A.

FIG. 1B is a sectional view seen in arrows B-B direction illustrated in FIG. 1A. Strength is reduced in the bent portions 30 due to, for example, removal of the collective coating layer 22 and bending. Accordingly, the bent portions 30 are covered with resin layer 40 for potting. Specifically, the resin layer 40 covers each of the bare fibers 21 with a uniform thickness T (distance between a surface of each of the bare fibers 21 and an outer surface of the resin layer 40). The resin layer 40 has cylindrical shapes in section and each of the cylindrical shapes partially superposed on one another in the arrangement direction of the bare fibers 21 so as to form a substantially waveform shape.

The thickness T of the resin layer 40 is from 50 to 3000 μm. When the thickness T is smaller than 50 μm, the strength of the bare fibers 21 may be reduced. However, when the thickness T is 50 μm or larger, the bare fibers 21 can be sufficiently protected. When the thickness T is larger than 3000 μm, this affects size reduction of the optical connection component 1. Thus, an appropriate value of the thickness T of the resin layer 40 is from 50 to 3000 μm.

In addition to the bent portion 30, the first unbent portions and parts of the second unbent portions 32 of the bent optical fibers 20 are also coated with the resin layer 40 so as to form a substantially waveform shape. In contrast, the collective coating layer 22 is not removed from the remaining parts of the second unbent portions 32. Thus, the remaining parts of the second unbent portions 32 are coated with the collective coating layer 22 having, for example, an oval shape in sectional view.

Figure 2:
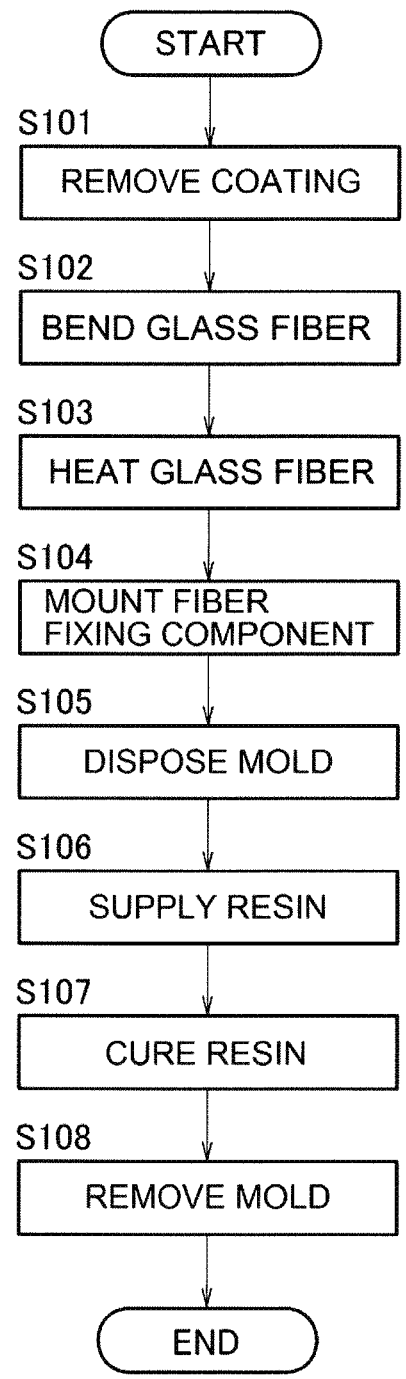
FIG. 2 is a flowchart of an example of a method of producing the optical connection component according to the present invention.

FIG. 2 is a flowchart of an example of the method of producing the optical connection component according to the present invention. According to the present example, first, optical fibers in which the bare fibers 21 are coated with the collective coating layer 22 are prepared. For example, the collective coating layer 22 corresponding to the parts of the second unbent portions 32, the bent portions 30, and the first unbent portions is removed by a tool or a solvent (step S101) so as to expose the bare fibers 21.

Next, the exposed bare fibers 21 are bent to the specified curvature (step S102). Furthermore, when reducing the stress generated in the bent portions 30, the position having been bent is heated (step S103). It is preferable that processing of the steps S102 and S103 be divided so as to be performed a plurality of times while the position to be bent is slightly varied every time the processing is performed. After that, the fiber fixing component 10 is mounted on the first unbent portions (step S104), and a mold for potting is disposed around the parts of the second unbent portions 32 (step S105). Then, the resin is supplied into the potting mold (step S106) and the resin having been supplied is cured (step S107). After that, the potting mold is removed (step S108).

Figure 3:
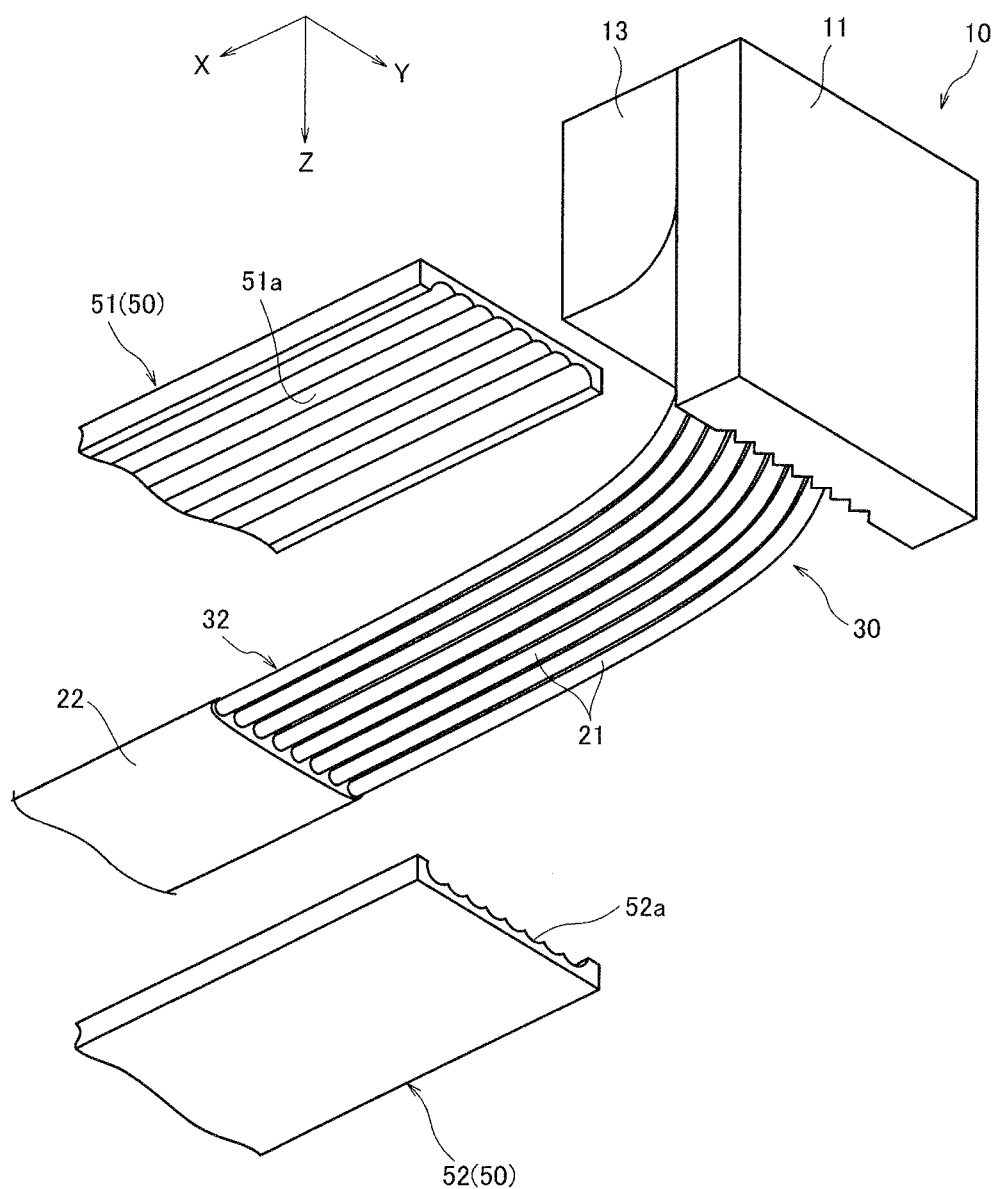
FIG. 3 is a perspective view illustrating the step of disposing a mold according to a first embodiment of the present invention.

FIGS. 3, 4A, 4B, and 5A illustrate the step of disposing the mold according to a first embodiment of the present invention. As illustrated in FIG. 3, the bare fibers 21 are exposed in the bent portions 30 and the parts of the second unbent portions 32, and the bent portions 30 are bent in the ZX plane. Furthermore, the fiber fixing component 10 is mounted on one end (first unbent portion) of each of the bare fibers 21 having been bent. The other end of each of the bare fibers 21 (remaining part of the second unbent portion 32) is coated with the collective coating layer 22 having an oval shape in sectional view.

Figure 5A:
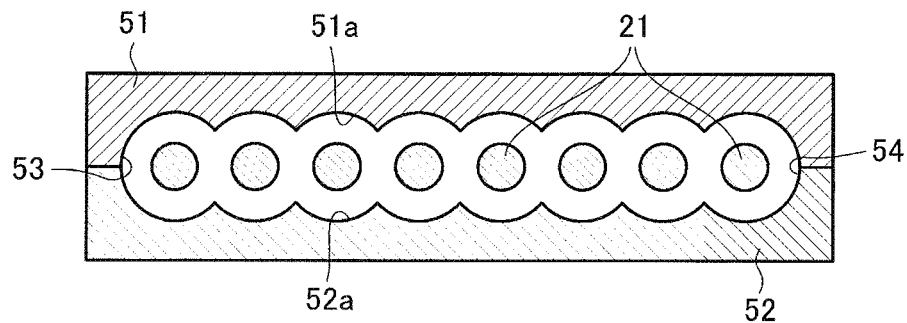
FIG. 5A is a sectional view illustrating the step of disposing the mold according to the first embodiment.

A mold 50 for molding is disposed at the bent portion 30 and parts of the second unbent portions 32. The mold 50 is formed of, for example, stainless steel (SUS) and separable into an upper mold 51 and a lower mold 52. The upper mold 51 has a waveform shape in section opening toward a positive Z-axis direction. The upper mold 51 has eight curved recesses 51a in its lower portion. Furthermore, the lower mold 52 is formed similarly to the upper mold 51 and has eight recesses 52a in its upper portion. The recesses 51a of the upper mold 51 and recesses 52a of the lower mold 52 are caused to face one another, and the bare fibers 21 are disposed between the upper mold 51 and the lower mold 52. As a result, as illustrated in FIG. 5A, the bare fibers 21 are disposed between the respective recesses 51a and the respective recesses 52a.

Figure 4A:
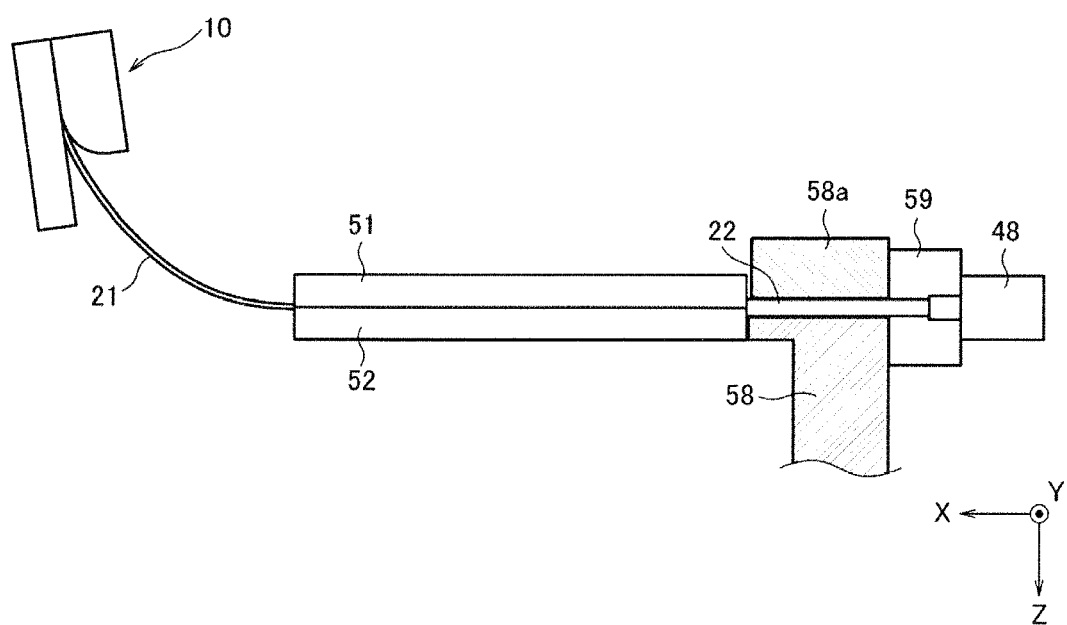
FIGS. 4A and 4B are respectively a side view and a plan view illustrating the step of disposing the mold according to the first embodiment.
Figure 4B:
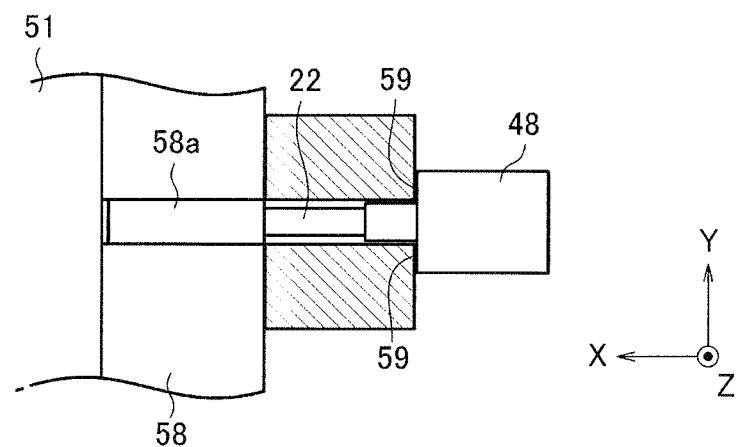

As illustrated in FIG. 4A, the position of the lower mold 52 in the Z axis direction is determined, for example, as follows: the part coated with the collective coating layer 22 (remaining part of the second unbent portion 32) is placed on a Z-direction stopper 58, and then, pressed from above by using a pressing member 58a so as to mechanically position the lower mold 52 relative to the Z-direction stopper 58. The lower mold 52 and the Z-direction stopper 58 may be integrated with each other. Furthermore, as illustrated in FIG. 4B, the position in the X axis direction is determined, for example, as follows: an X-direction stopper 59 is integrally formed with the Z-direction stopper 58 at a rear end of the Z-direction stopper 58, and a front end surface of the connector 48 is brought into contact with a rear end surface of the X-direction stopper 59.

Figure 5B:
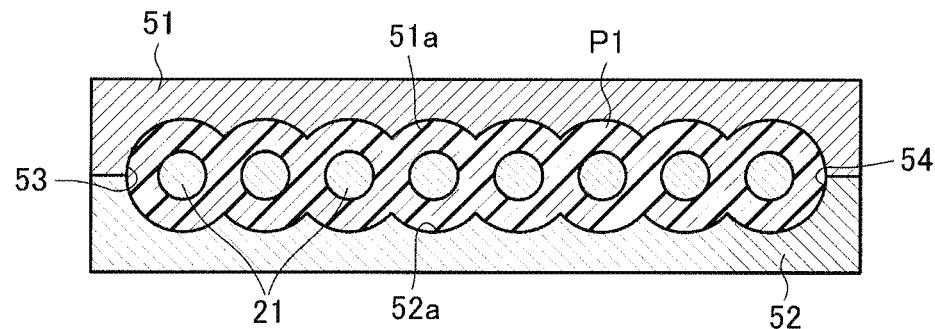
FIG. 5B is a sectional view illustrating the step of supplying resin and the step of curing the resin according to the first embodiment.

FIG. 5B is a sectional view illustrating the resin supplying step and the resin curing step. A potting resin P1 is supplied through a supply port (not illustrated) provided in, for example, the upper mold 51 to a space inside the upper mold 51 and the lower mold 52 positioned as described above. Consequently, the resin P1 surrounds the bare fibers 21 along the recesses 51a and 52a and flows toward sidewalls 53 and 54 located at both sides of arrangement of the recesses 51a and the recesses 52a. The distance between the sidewall 53 and the sidewall 54 is larger than the distance between the bare fibers 21 located at both the sides. The potting resin P1 corresponds to resin of the present invention, and the sidewalls 53 and 54 correspond to sidewalls of the present invention.

Then, when the upper mold 51 and the lower mold 52 are removed after the potting resin P1 has been cured, the resin layer 40 is formed even between the side walls 53 and 54 and the respective endmost bare fibers 21. Thus, the resin layer 40 having a uniform thickness is formed around the bare fibers 21. As described above, in the parts of the second unbent portions 32 where the bare fibers 21 are exposed, the resin layer 40 is also formed around the bare fibers 21 located at both the sides. This allows the strength of the bent optical fibers 20 to be improved.

Furthermore, since the resin layer 40 having a uniform thickness T is formed around the bare fibers 21, uniform resistance can be provided against loads in any of the upper, lower, and side directions. Although the potting resin P1 is, for example, an ultra-violet (UV) curable resin (for example, XVL-14 made by Kyoritsu Chemical & Co., Ltd.), a thermal curable resin may be used. Young's modulus of any of the above-described resins is 2.0 MPa or larger.

Figure 6A:
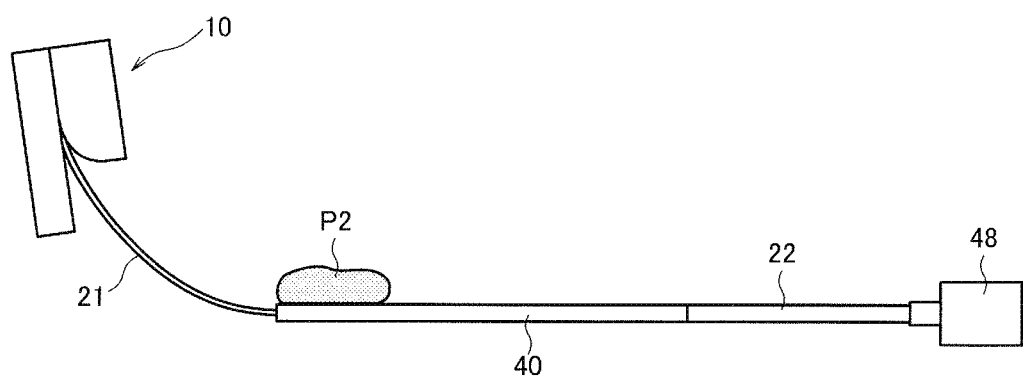
FIGS. 6A, 6B, and 6C illustrate supplying of the resin to the bent portion.
Figure 6B:
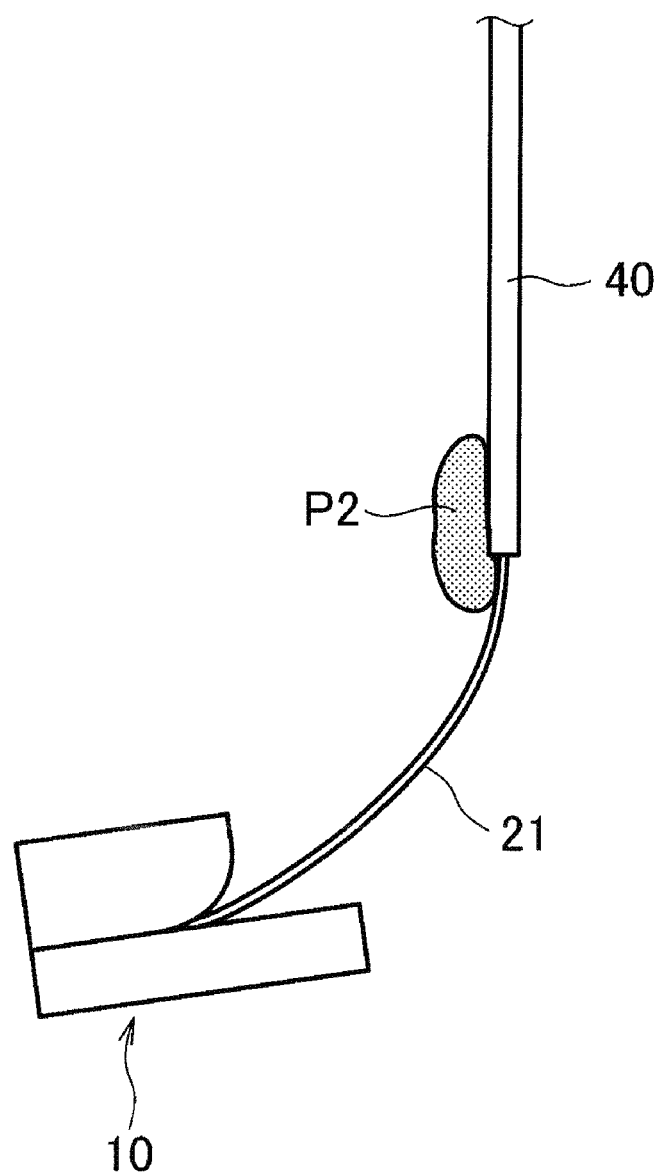
Figure 6C:
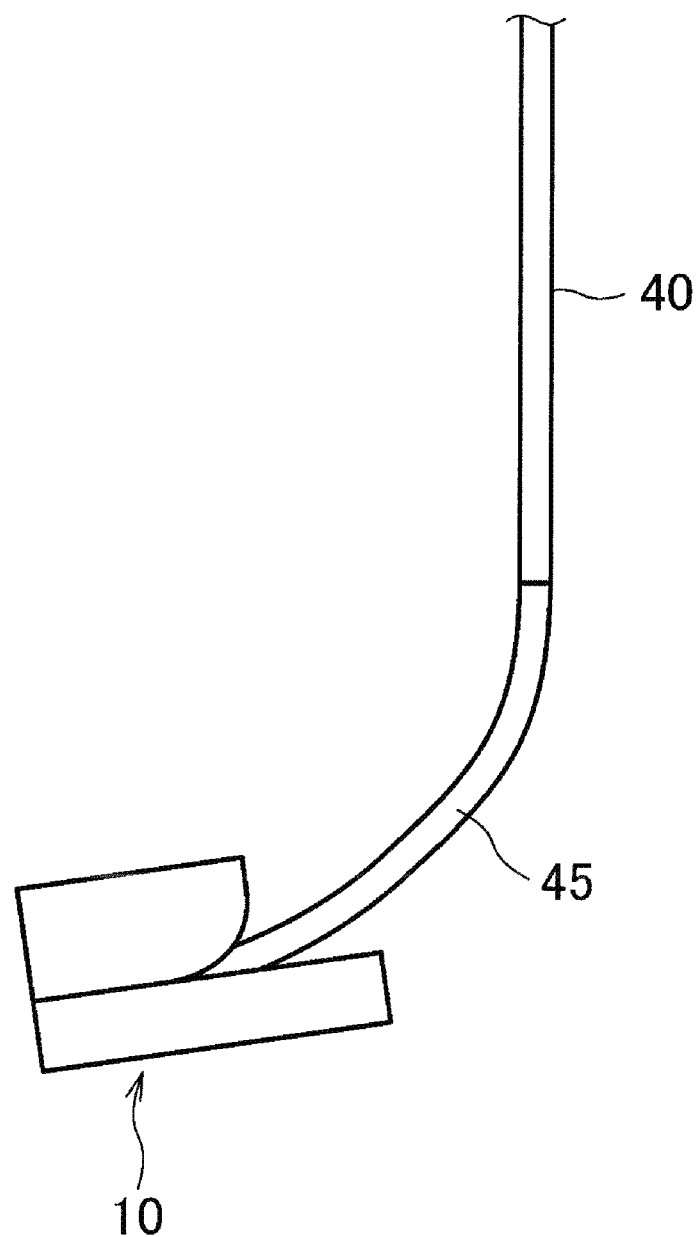

FIGS. 6A, 6B, and 6C illustrate supplying of resin to the bent portion 30. The bent portions 30 where the bare fibers 21 are exposed are protected by a different potting resin after the parts of the second unbent portions 32 have been protected by the resin layer 40. Also in this case, in order to reduce difficulty, due to surface tension, of concentration of the resin to a surrounding of the bent optical fibers located at both the sides, it is preferable to arrange walls having an interval larger than the distance between the bare fibers 21 located at both the sides on both sides of the bent portion 30.

When a different potting resin P2 is applied onto the resin layer 40 (FIG. 6A), and the bare fibers 21 are caused to stand erect such that the fiber fixing component 10 faces downward, the different potting resin P2 flows along parts of the bare fibers 21 located in the bent portion 30 toward the fiber fixing component 10 (FIG. 6B) and surrounds the bare fibers 21. After that, when the potting resin P2 is cured, resin layer 45 is formed around the parts of the bare fibers 21 located in the bent portion 30 (FIG. 6C). According to the first embodiment, an example has been described in which the mold is disposed at the parts of the second unbent portions 32, and the resin layer is formed at the bent portions 30 without use of the mold. However, the present invention is not limited to this example. For example, the resin layer may be provided by using a mold that covers the bent portions 30 in addition to the second unbent portions 32.

Figure 7A:
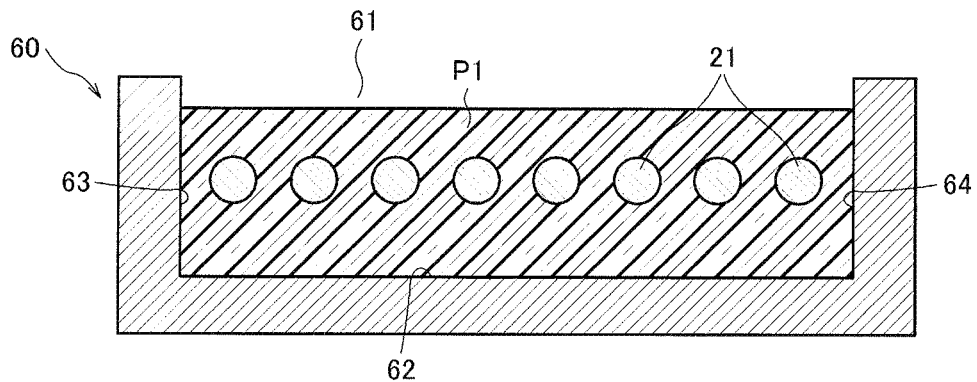
FIG. 7A is a sectional view illustrating the step of supplying the resin and the step of curing the resin according to a second embodiment of the present invention.

FIG. 7A illustrates the resin supplying step and the resin curing step according to a second embodiment of the present invention. Although the mold separable into the upper mold and the lower mold is used in the example according to the first embodiment, a mold formed as a single unit may be used. Specifically, this single-unit mold has a U shape in sectional view and has a top opening 61, a bottom 62 facing the top opening 61, and sidewalls 63 and 64 extending upward from the bottom 62. The sidewalk 63 and 64 also correspond to the sidewalls of the present invention.

Inner surfaces of the bottom 62 and the sidewalls 63 and 64 are flat. When the bare fibers 21 are disposed between the top opening 61 and the bottom 62, and the potting resin P1 is supplied, for example, applied in a reciprocating path in the arrangement direction of the bare fibers 21, from above a mold 60 having been positioned, the resin P1 flows from the adjacent bare fibers 21 and spaces between the bare fibers 21, flows along the bottom 62 so as to surround the bare fibers 21, and then flows toward the side walls 63 and 64.

Figure 7B:
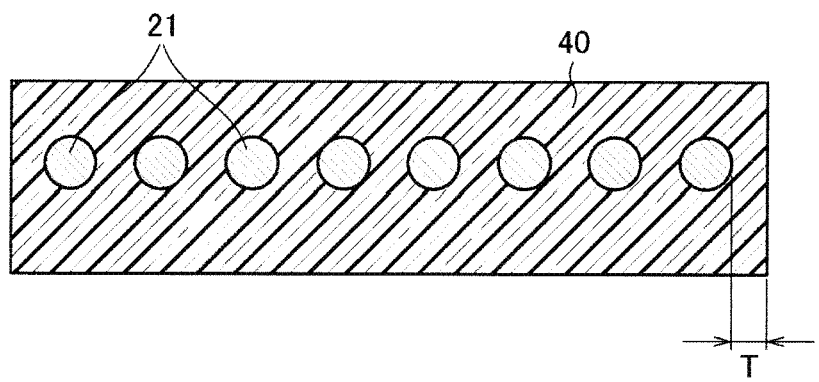
FIG. 7B is a sectional view illustrating a state after removal of the mold.

Then, when the mold 60 is removed after the potting resin P1 has been cured, as illustrated in FIG. 7B, the resin layer 40 having a rectangular shape in sectional view and having the thickness of T is also formed between the side walls 63 and 64 and the respective endmost bare fibers 21. As described above, with a U shape formed by the bottom 62 and the sidewalls 63 and 64, the resin P1 is easily received in the mold 60. Furthermore, a region above the bare fibers 21 is open. Accordingly, the resin P1 is easily supplied to the bare fibers 21 compared to the case where the region above the bare fibers 21 is covered by the mold. Furthermore, since the contact area where the mold and the resin layer are in contact with one another is reduced, the mold is easily removed from the resin layer.

Figure 8A:
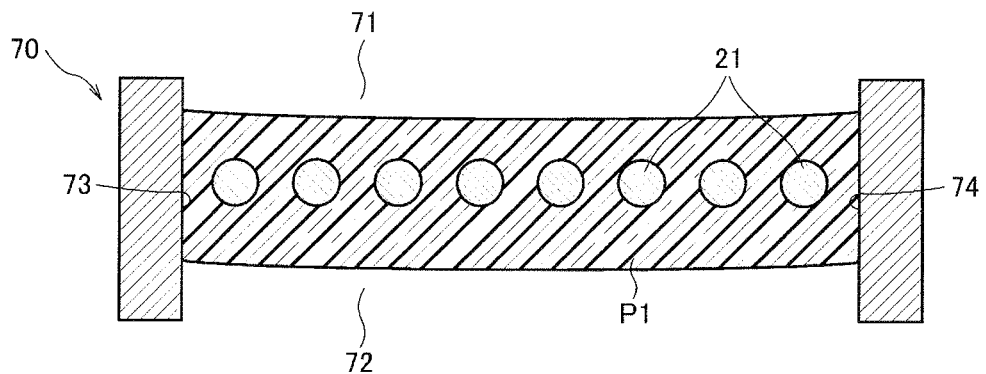
FIG. 8A is a sectional view illustrating the step of supplying the resin and the step of curing the resin according to a third embodiment of the present invention.
Figure 8B:
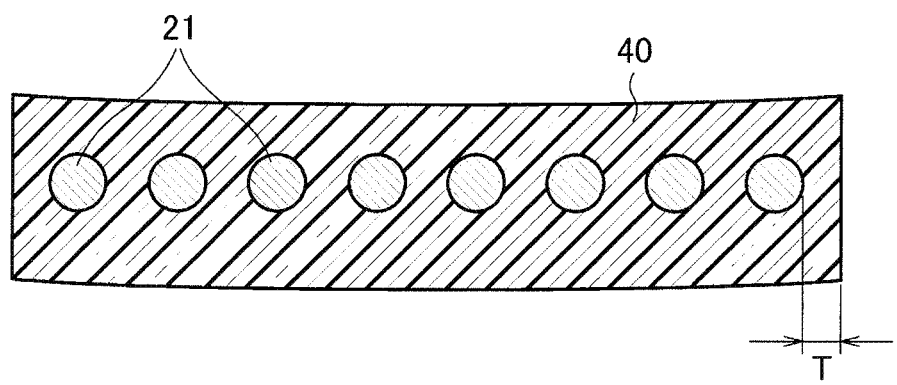
FIG. 8B is a sectional view illustrating a state after removal of the mold.

FIGS. 8A and 8B illustrate the resin supplying step and the resin curing step according to a third embodiment of the present invention. Although the mold is disposed below the bare fibers 21 according to the first and second embodiments, the mold may be disposed only beside the bare fibers 21. Specifically, a mold 70 has a top opening 71, a bottom opening 72 facing the top opening 71, and sidewalls 73 and 74. The sidewalls 73 and 74 are located beside the top opening 71 and the bottom opening 72 and vertically extending. The sidewalls 73 and 74 also correspond to the side walls of the present invention.

Inner surfaces of the sidewalls 73 and 74 are flat. When the bare fibers 21 are disposed between the top opening 71 and the bottom opening 72, and the potting resin P1 is applied, for example, in a reciprocating path in the arrangement direction of the bare fibers 21 from above the mold 70 having been positioned, the resin P1 flows along the adjacent bare fibers 21 so as to surround the bare fibers 21 toward the side walls 73 and 74.

Then, when the mold 70 is removed after the potting resin P1 has been cured, as illustrated in FIG. 8B, the resin layer 40 that having a rectangular shape in sectional view and having the thickness of T is also formed between the side walls 73 and 74 and the respective endmost bare fibers 21. As described above, regions above and below the bare fibers 21 are open. Accordingly, the resin P1 is easily cured compared to the case where the region above or below the bare fibers 21 is covered by the mold. Furthermore, since the contact area where the mold and the resin layer are in contact with one another is reduced, the mold is more easily removed from the resin layer.

It should be understood that the embodiments disclosed herein are exemplary and not limiting in any sense. The scope of the present invention is defined not by the above-described meaning but by the claims. In addition, it is intended that any change within the meaning and the scope equivalent to the claims is included in the scope of the present invention.

What is claimed is:

1. A method of producing an optical connection component, the optical connection component including a fiber array having a plurality of bent glass fibers arranged side by side and a resin layer covering the fiber array, each of the bent glass fibers having a first unbent portion, a bent portion, and a second unbent portion, the bent portion being provided between the first unbent portion and the second unbent portion, and each of the bent glass fibers including a core and a cladding that surrounds the core and that has a lower refractive index than a refractive index of the core, and the method comprising:

providing around the second unbent portion of the fiber array a mold that includes two walls spaced apart from each other by a larger distance than a width of the fiber array such that each of the two walls is disposed outside a corresponding one of two glass fibers that are included in the plurality of bent glass fibers and that are located at respective sides of the fiber array;

supplying resin into the mold;

forming the resin layer by curing the resin;

removing the fiber array coated with the resin layer from the mold, applying a potting resin onto the resin layer, flowing the potting resin through the bent portion to the first unbent portion, and curing the potting resin.

2. The method according to claim 1,
   wherein the mold is separable and structured so as to cover both upper and lower surfaces of the fiber array, and
   wherein a curved recess is provided in the mold so as to form the resin layer having a uniform thickness.

3. The method according to claim 1,
   wherein the mold has a U-shaped section that has the two walls and a bottom surface connecting the two walls to each other, and
   wherein the mold is provided around the fiber array such that one surface of the fiber array faces the bottom surface and another surface of the fiber array faces an opening of the mold.

4. The method according to claim 1,
   wherein the mold is provided around the fiber array such that both upper and lower surfaces of the fiber array face openings of the mold.

5. The method according to claim 1, the method further comprising:
   preparing a plurality of optical fibers, each of the plurality of optical fibers including a glass fiber and a coating resin layer covering the glass fiber, the glass fiber including the core and the cladding,
   removing the coating resin layer from each of the plurality of optical fibers to expose the plurality of glass fibers; and
   heating and bending the plurality of glass fibers so as to provide the fiber array.

6. The method according to claim 1,
   wherein the resin layer has a thickness of $50 \times 10^{-6}$ or more and $3000 \times 10^{-6}$ m or less.

\* \* \* \* \*